(12) United States Patent
Lin et al.

(10) Patent No.: US 8,182,825 B2
(45) Date of Patent: May 22, 2012

(54) MESSAGE ENERGY MEMORY CERAMICS

(76) Inventors: Min-Chu Lin, Kaohsiung (TW);
Min-Chou Lin, Kaohsiung (KR)

( * ) Notice: Subject to any disclaimer, the term of this patent is extended or adjusted under 35 U.S.C. 154(b) by 1255 days.

(21) Appl. No.: 11/762,054

(22) Filed: Jun. 12, 2007

(65) Prior Publication Data

US 2008/0312066 A1    Dec. 18, 2008

(51) Int. Cl.
*A61K 9/00* (2006.01)
*A61K 9/14* (2006.01)

(52) U.S. Cl. ......... 424/400; 424/489; 424/490; 428/402

(58) Field of Classification Search .................. None
See application file for complete search history.

(56) References Cited

U.S. PATENT DOCUMENTS

| | | | | |
|---|---|---|---|---|
| 5,258,228 | A * | 11/1993 | Komuro | 428/402 |
| 5,965,007 | A * | 10/1999 | Uzawa | 205/687 |
| 2002/0066233 | A1* | 6/2002 | McArdle et al. | 51/308 |
| 2005/0006592 | A1* | 1/2005 | Kitada | 250/428 |

* cited by examiner

*Primary Examiner* — Robert A Wax
*Assistant Examiner* — Olga V Tcherkasskaya

(57) ABSTRACT

The present invention provides a message energy memory ceramics. The message information memory ceramics includes: (1) a plurality of message energy memory ceramics grains composed of a silicon oxide, an aluminum oxide, a sodium oxide, a potassium oxide, a magnesium oxide, a calcium oxide, a titanium oxide, an ferric oxide, a manganese oxide, and a zinc oxide; and (2) a powder of message energy memory ceramics grains composed of a silicon oxide, an aluminum oxide, a sodium oxide, a potassium oxide, a magnesium oxide, a calcium oxide, a titanium oxide, an ferric oxide, a manganese oxide, and a zinc oxide. The products of the present invention can be applied to general water supply stations, water towers, and drinking water machines.

1 Claim, 6 Drawing Sheets

MESSAGE ENERGY MEMORY CERAMICS

BACKGROUND OF THE INVENTION

1. Field of Invention

The present invention relates to a message energy memory ceramics, and more particularly to a message energy memory ceramics made by metallic oxides capable of changing the structure of water molecules to obtain a steady energy (light quantum), delivering message by the photons, and penetrating into the living organism to activate and correct the living organism so as to metabolize harmful materials.

2. Description of Related Art

The general energy sources, such as the far infrared ray, the magnetite, and the π energy, can only activate the water containing foreign materials. If there is no foreign material existing in the water, the activation cannot happen. Due to uneven energy electron motion thereof, the above-mentioned types of energy cannot be absorbed effectively. Therefore, the far infrared ray, the magnetite, and the π energy are named as the "mineral magnetic field" and can only induce resonance with water containing foreign materials. Thus, pure water, such as reverse osmosis water, cannot be activated by the above-mentioned types of energy.

The so-called "energy water" is made by illuminating water with the far infrared ray to obtain a fine-molecule-group water, or a micro water. Furthermore, the anion water, the π water, or the superoxide water can be obtained by passing the water through an ion-energy source. The above-mentioned processes are illustrated in FIGS. 1 and 2. However, none of the of the fine-molecule-group water, the micro water, the anion water, the π water, or the superoxide water can effectively lock the wave material of any target with the frequency thereof. It is because the fining or microminiaturizing degrees of these types of water are not well enough. Just like that a magnetic tape cannot provide a clear-enough voice record, the above-mentioned types of energy water cannot perform desired functions as people anticipate.

General types of energy water, due to insufficient fining degree and lacking of accurate messages, are limited in preservation and effects. For example, such water may be time-dependently declined. It is because in the agent that transforms the water, there is no medium to keep the energy message, time message, and the message energy as needed.

SUMMARY OF THE INVENTION

A primary object of the present invention is to provide a message energy memory ceramics. The powder of the message energy memory ceramics is formed by preparing metallic oxides to be processed by agitating and calcining, drying, cooling, and grinding steps. The powder is then mixed with argil and then the pellets of the message energy memory ceramics are obtained by the processes of granule making, forging, and cooling. Such a message-memory ceramics, while being put into the water, divides the water molecules into smaller groups, and thus changes the water as a functional water having micro groups. The status of the momentum and angular momentum of water molecules are changed, and thus transform the water molecules. The electrons are excited so that the electron cloud around the atomic nucleus is broken up, and the protons and the neutrons are destroyed. The water molecules obtain stable energy, the photons (light quantum) are released and the message is delivered. The energy water can also permeate into the living organisms. Furthermore, the products of the present invention can be applied to water making machines, water towers, and drinking water machines, etc.

BRIEF DESCRIPTION OF THE DRAWINGS

The other objects and features of the present invention can be more fully understood by referring to the following description of the preferred embodiments and accompanying drawings, in which.

DETAILED DESCRIPTION OF THE PREFERRED EMBODIMENT

Figure 1:
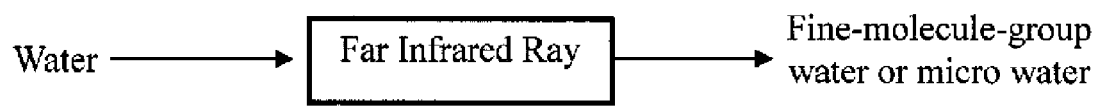
FIG. 1 illustrates a manufacture method of conventional energy water.
Figure 2:
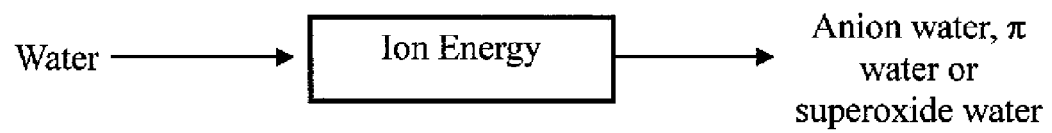
FIG. 2 illustrates another manufacture method of conventional energy water.

The present invention provides a message energy memory ceramics, wherein the message energy water is also called as memory chip water. The functions relating to the memory and the message operated in the water may mostly attribute to the memory ceramics. It is because the information memorized in the memory ceramics enables the materials existing among the water molecules to be rearranged and also transforms the property of water having micro materials. For example, the reverse osmosis water can be transformed into smaller water molecule groups, so as to generate message in the water to change the magnetic fields of the organisms. Accordingly, the physical properties of the organisms return to the original conditions; the toxins are drained; and the organisms can be activated and maintain freshness. The message energy is delivered by the photons, which have no mass and keep on a constant velocity of light. In other words, according to the message energy memory ceramics, the status of the momentum and angular momentum of water molecules are changed, and thus transforms the water molecules. The electrons are excited so that the electron cloud around the atomic nucleus is broken up, and the protons and the neutrons are destroyed. The water molecules obtain stable energies, the photons (light quantum) are released and the message is delivered. The energy water can also permeate into the living organisms. The field of the living organism is thus stabilized, and the electric field thereof can thus return to the original condition. The living organisms in bad conditions can thus be activated and the harmful materials are metabolized.

The message energy memory ceramics of the present invention are mainly composed of metallic oxides and can be classified as follows:

(1) memory ceramics grains: composed of silicon oxide (a) (30~60 wt %), taluminum oxide (b) (25~40 wt %), sodium oxide (c) (0.05~1.5 wt %), potassium oxide (d) (0.5~2 wt %), magnesium oxide (e) (0.5~1 wt %), calcium oxide (f) (0.5~1 wt %), titanium oxide (g) (0.5~1 wt %), ferric oxide (h) (2.5~5 wt %), manganese oxide (i) (0.01~0.05 wt %), and zinc oxide (j) (0.005~0.05 wt %); and (2) memory ceramics powder: composed of silicon oxide (a) (30~40 wt %), aluminum oxide (b) (25~32 wt %), sodium oxide (c) (1.5~2 wt %), potassium oxide (d) (0.1~0.3 wt %), magnesium oxide (e) (0.8~2 wt %), calcium oxide (f) (0.3~0.5 wt %), titanium oxide (g) (0.05~0.2 wt %), ferric oxide h (20~22 wt %), manganese oxide (i) (0.008~0.002 wt %), and zinc oxide (j) (1.5~1.8 wt %).

The manufacturing steps of the message energy memory ceramics according to the invention include the following.

(1) First of all, execute an agitating step A to obtain an evenly-mixed mixture by mixing the following compositions in the designated proportions: silicon oxide (a) (30~60 wt %), aluminum oxide (b) (25~40 wt %), sodium oxide (c) (0.05~1.5 wt %), potassium oxide (d) (0.5~2 wt %), magnesium oxide (e) (0.5~1 wt %), calcium oxide (f) (0.5~1 wt %), titanium oxide (g) (0.5~1 wt %), ferric oxide (h) (2.5~5 wt %), manganese oxide (i) (0.01~0.05 wt %), and zinc oxide (j) (0.005~0.05 wt %).

(2) Then, remove unwanted impurities with calcining/drying step B for 12 hours at a temperature ranged between 1100° C.~1250° C.

(3) Execute a cooling step C, and then sieve out the sintering materials containing higher ratios of heavy metals.

(4) Proceed the grinding step D.

Figure 4:
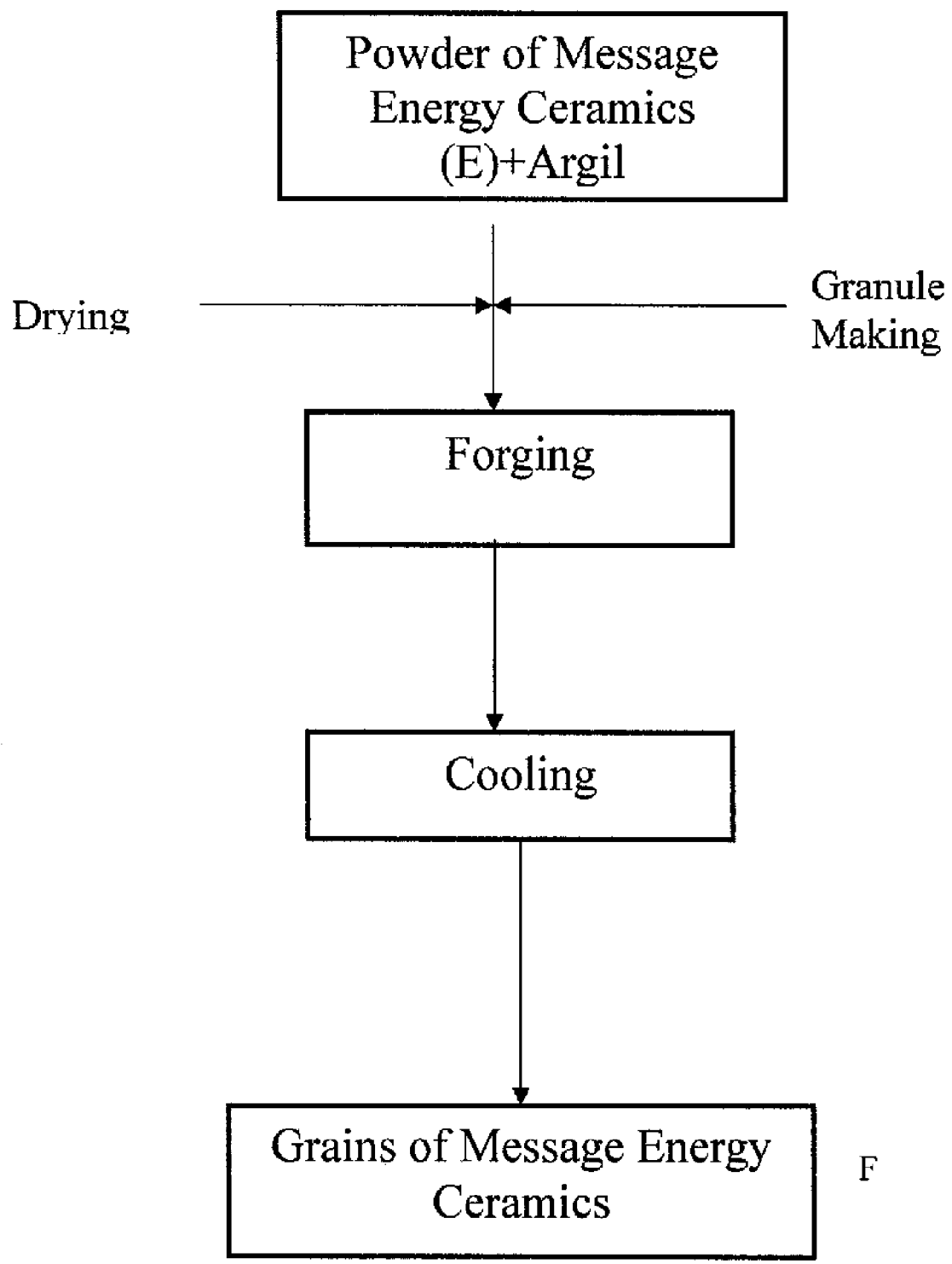
FIG. 4 schematically illustrates a flow chart of another manufacturing process according to an embodiment of the present invention.

(5) The grinded material is then put into a container to be oxidized and cooled to obtain the powder of the message energy memory ceramics E, as shown in FIG. 4.

Figure 3:
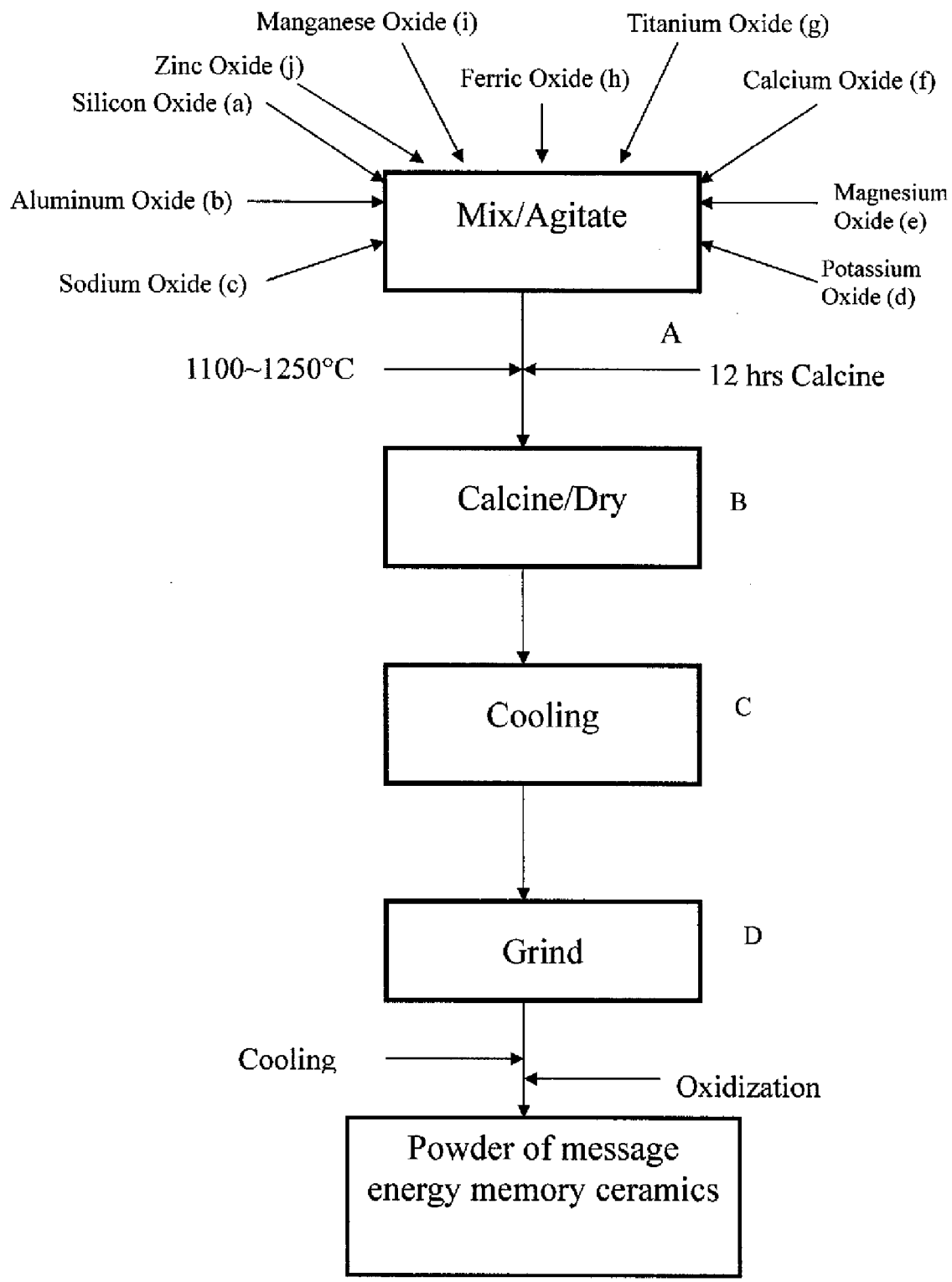
FIG. 3 schematically illustrates a flow chart of a manufacturing process according to an embodiment of the present invention.

(6) Mix the powder of the message energy memory ceramics E (70 wt %) obtained from the process shown in FIG. 3 with argil (30 wt %) to make granules, and then execute drying, calcining, and cooling Processes. Finally, as shown in FIG. 4, the grains of the message energy memory ceramics F is obtained.

Figure 5:
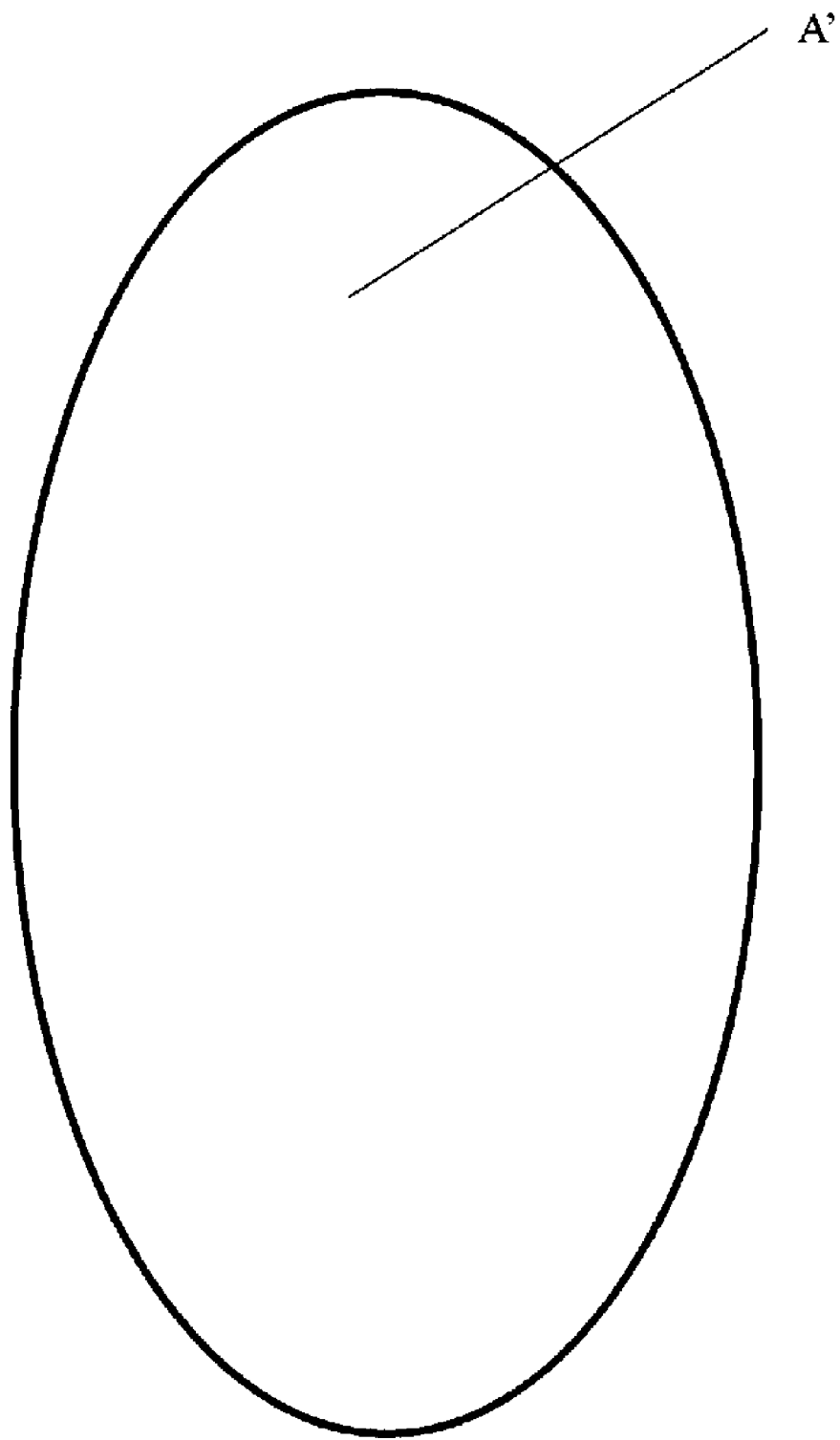
FIG. 5 schematically illustrates a normal message of the message-energy memory water according to the present invention.
Figure 6:
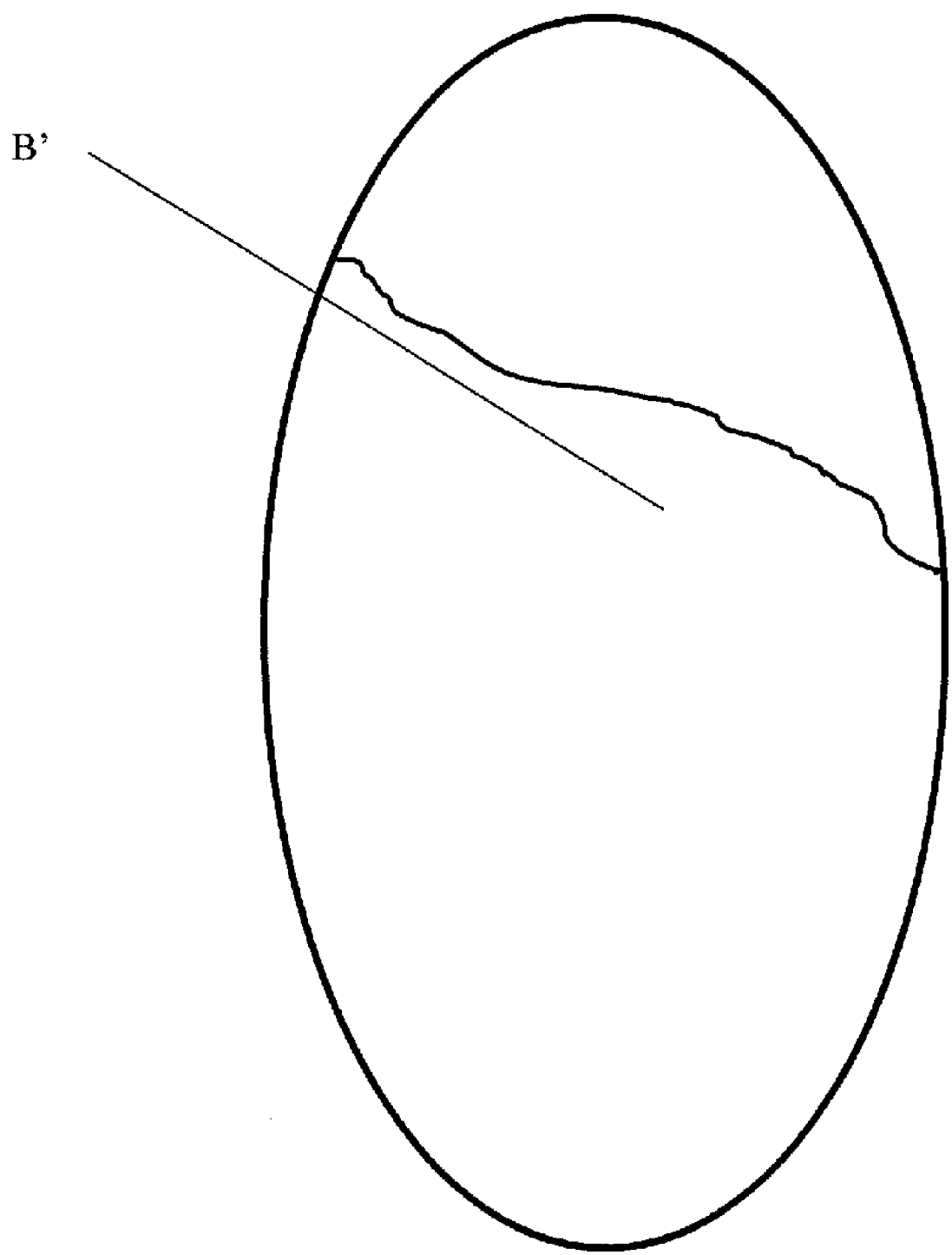
FIG. 6 schematically illustrates an incorrect message.
Figure 7:
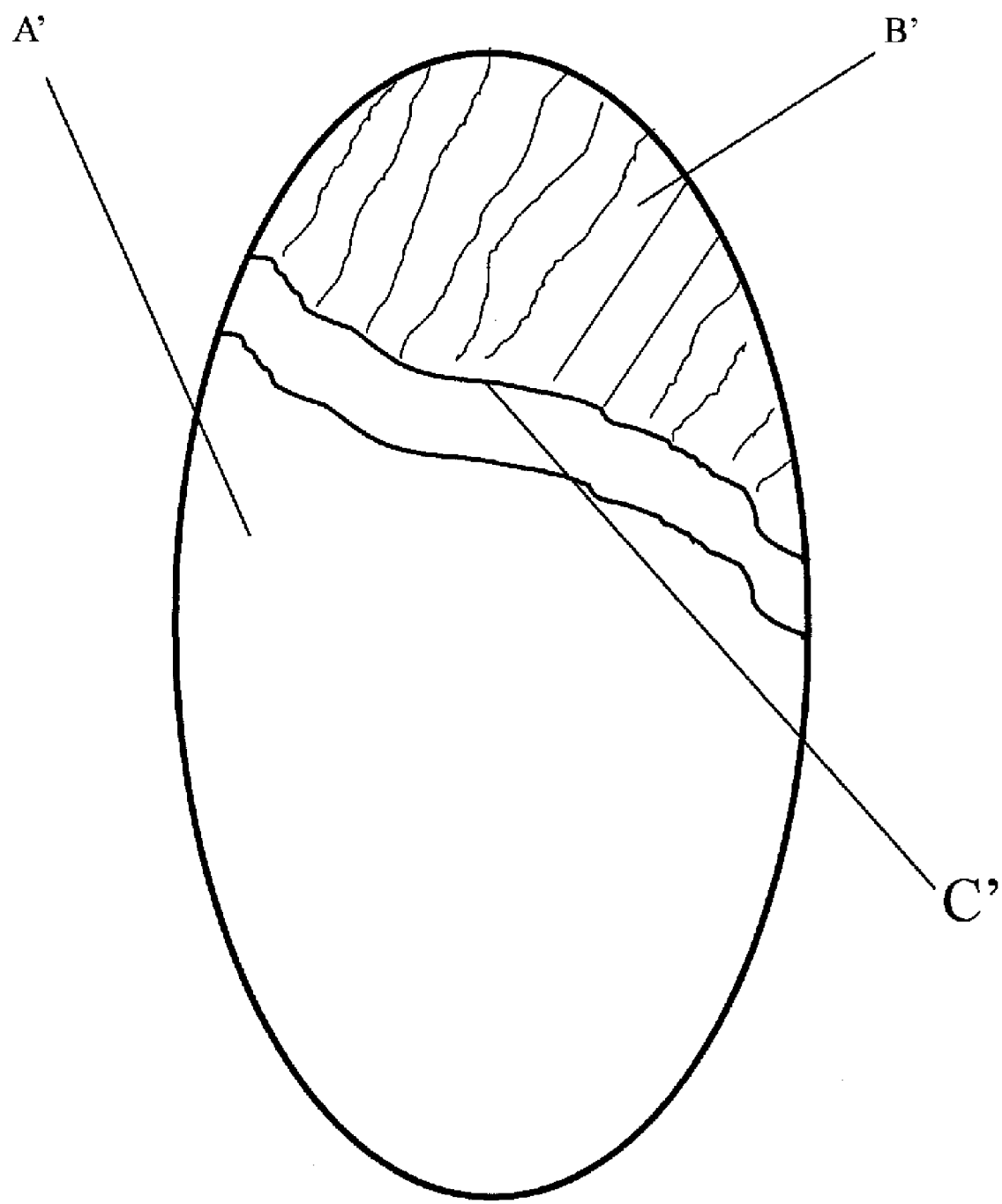
FIG. 7 schematically illustrates a correcting wave generated by a resonance between the message of the message energy water according to the present invention and an incorrect message.

The message-memory ceramics according to the present invention divides the water molecules into smaller groups, and thus changes the water as functional water having micro groups. Such kinds of water can be applied in the biological fields, the agricultural/food industries, and the biochemical industry. These kind of water can not only deliver messages but also infiltrate into the bodies of living organisms. A correcting wave generated by a resonance between the message of the message energy water according to the present invention and an incorrect message is as shown in FIG. 5. The regular oval-shaped signal, as shown in FIG. 5, is a normal message A. An incorrect message B is indicated in FIG. 6. The correcting wave C generated by the resonance of the message energy is shown in FIG. 7. The correcting wave C will correct the incorrect portion of the incorrect message B. Accordingly, the incorrect message B is corrected into the normal message A and the condition of the water is improved in an optimum way. The message water of the present invention has behaviors similar to the thinking ability stored in the human body. The "thinking" message water is surveyed by a Quantum Resonance Spectrometer (QRS) with "unthinking" message water serving as a reference.

For helping a better understanding to the present invention, an embodiment of the present invention is described as below.

According to the above-mentioned manufacturing processes, silicon oxide (40 wt %), aluminum oxide (32 wt %), sodium oxide (1.8 wt %), potassium oxide (0.3 wt %), magnesium oxide (1.7 wt %), calcium oxide (0.5 wt %), titanium oxide (0.2 wt %), ferric oxide (20.5 wt %), manganese oxide (0.3 wt %), and zinc oxide (0.025 wt %) are mixed and agitated in the designated proportions. After the calcining/drying process at a temperature ranged between 1100° C.~1250° C., the materials indicating black color after calcining are sieved out. After cooling and grinding, the remaining materials are placed into a container for being oxidized and cooled. Accordingly, the powder of the message information memory ceramics is obtained. Take 0.01 g of such powder as a sample to be melted and tested in a high temperature. The result data is listed in Attachment 1 (according to National Taiwan Craft Research Institute test on Jul. 12, 2007). The powder is then mixed with argil (30 wt %). After drying, granule making, and calcining/cooling, the grains of the message energy memory ceramics are thus obtained. Take 0.03 g of the grains as a sample for a high-temperature melting test. The testing result is listed in Attachment 2 (according to National Taiwan Craft Research Institute test on Aug. 1, 2007). The product can be applied in water making machines of water supplying stations, water towers, drinking water machines, etc.

While the invention herein disclosed has been described by means of specific embodiments, numerous modifications and variations could be made thereto by those skilled in the art without departing from the scope and spirit of the invention set forth in the claims.

Attachment 1
National Taiwan Craft Research Institute
Address: No. 16, allley 92, lane 436, Yintao Rd., Yingko, Taipei, Taiwan, R.O.C.
Telephone: (02)26705308EXT10

| Manufacturer | Lightwave Nano Biotech Co., Ltd. |
|---|---|
| Tel/Fax | 886-07-7168880/7168112 |
| Sample Name | Memory ceramics powder |
| Receiving Date | 2006/07/03 |
| Test Date | 2006/07/07 |
| Test Lab | Yinko Center/Chemical Lab |

| Items | Results |
|---|---|
| $SiO_2$ | 39.53% |
| $Al_2O_3$ | 31.56% |
| $Na_2O$ | 1.70% |
| $K_2O$ | 0.28% |
| MgO | 1.68% |
| CaO | 0.43% |
| $TiO_2$ | 0.16% |
| $Fe_2O_3$ | 20.31% |
| $MnO_2$ | 0.27% |
| ZnO | 0.02% |
| Loss | 1.56% |
| Total | 97.50% |

ELUCIDATION:

1. All the results in this report are correspondence to the conditions of the samples as they were received, whereas any unauthorized amendments or corrections to this report will make it void.
2. The contents of this report are forbidden for the advertisement, business and the indictment purposes.
3. Sample and title of the report are provided by the client. This Lab is only responsible for testing and analyzing.

Attachment 2
National Taiwan Craft Research Institute
Address: No. 16, allley 92, lane 436, Yintao Rd., Yingko, Taipei, Taiwan, R.O.C.
Telephone: (02)26705308EXT10

| Manufacturer | Lightwave Nano Biotech Co., Ltd. |
|---|---|
| Tel/Fax | 886-07-7168880/7168112 |
| Sample Name | Memory ceramics raw material |
| Receiving Date | 2006/07/24 |
| Test Date | 2006/07/31 |
| Test Lab | Yinko Center/Chemical Lab |

-continued

Attachment 2
National Taiwan Craft Research Institute
Address: No. 16, allley 92, lane 436, Yintao Rd., Yingko, Taipei, Taiwan, R.O.C.
Telephone: (02)26705308EXT10

| Items | Results |
| --- | --- |
| $SiO_2$ | 53.85% |
| $Al_2O_3$ | 37.17% |
| $Na_2O$ | 1.28% |
| $K_2O$ | 1.58% |
| MgO | 0.61% |
| CaO | 0.73% |
| $TiO_2$ | 0.69% |
| $Fe_2O_3$ | 4.04% |
| $MnO_2$ | 0.04% |
| ZnO | 0.01% |
| Loss | — |
| Total | 100.00% |

ELUCIDATION:
1. All the results in this report are correspondence to the conditions of the samples as they were received, whereas any unauthorized amendments or corrections to this report will make it void.
2. The contents of this report are forbidden for the advertisement, business and the indictment purposes.
3. Sample and title of the report are provided by the client. This Lab is only responsible for testing and analyzing.

What is claimed is:

1. Memory energy memory ceramics granules prepared by a process comprising:

(1) preparing evenly-mixed mixture of silicon oxide (30-60 wt %), aluminum oxide (25-40 wt %), sodium oxide (0.05-1.5 wt %), potassium oxide (0.5-2 wt %), magnesium oxide (0.5-1 wt %), calcium oxide (0.5-1 wt %), titanium oxide (0.5-1 wt %), ferric oxide (2.5-5 wt %), manganese oxide (0.01-0.05 wt %), and zinc oxide (0.005-0.05 wt %);

(2) removing impurities and calcining/drying for 12 hours at 1100-1250° C.;

(3) sieving out the sintering materials with high ratio of heavy metals;

(4) grinding it to powder;

(5) oxidizing the powder and mixing it with argil as 70:30 wt %; and (6) making granules.

* * * * *